United States Patent [19]

Naemura et al.

[11] Patent Number: 5,307,154
[45] Date of Patent: Apr. 26, 1994

[54] SEMICONDUCTOR CHIP POSITION DETECTOR

[75] Inventors: Junichi Naemura; Mamoru Okanishi; Masao Yamazaki, all of Nara, Japan

[73] Assignee: Sharp Kabushiki Kaisha, Osaka, Japan

[21] Appl. No.: 812,023

[22] Filed: Dec. 23, 1991

[30] Foreign Application Priority Data

Dec. 27, 1990 [JP] Japan .................................. 2-408063

[51] Int. Cl.⁵ ............................................. G01B 11/00
[52] U.S. Cl. .................................... 356/400; 356/375
[58] Field of Search ............................... 356/399–401, 356/375, 394; 250/548

[56] References Cited

U.S. PATENT DOCUMENTS

| 4,515,479 | 5/1985 | Pryor | 356/375 |
| 4,575,637 | 3/1986 | Sullivan, Jr. | 356/375 |
| 4,647,208 | 3/1987 | Bieman | 356/394 |

FOREIGN PATENT DOCUMENTS

| 0213206 | 3/1987 | European Pat. Off. |  |
| 0272108 | 11/1987 | Japan | 356/394 |
| 2067280 | 7/1981 | United Kingdom. |  |
| 2106642 | 4/1983 | United Kingdom. |  |
| 1507365 | 4/1987 | United Kingdom. |  |
| 2183820 | 6/1987 | United Kingdom. |  |

Primary Examiner—Richard A. Rosenberger
Assistant Examiner—K. P. Hantis
Attorney, Agent, or Firm—Nixon & Vanderhye

[57] ABSTRACT

A semiconductor chip position detector including a transparent film on which semiconductor chips are placed, a film table on which the film is placed, a light source, optical fiber cables provided in the vicinity of the film table, by which light beams from the light source are radiated onto the semiconductor chips through the film having the semiconductor chips placed thereon, and a position recognition device provided above the film for recognizing the positions of the semiconductor chips based on shadow shapes of the semiconductor chips generated by the radiated light.

10 Claims, 4 Drawing Sheets

SEMICONDUCTOR CHIP POSITION DETECTOR

BACKGROUND OF THE INVENTION

1. Field of the Invention

The present invention relates to a device for detecting the positions of diced semiconductor chips placed on a film in the case where they are die-bonded to a lead frame or the like by means of a die bonding device.

2. Description of the Prior Art

A die bonding device serves to pick up semiconductor chips on a film and to die-bond the same to a lead frame or the like. It is necessary to precisely know the positions of the chips in order to pick up the chips on the film accurately. The die bonding device is provided with an optical position detector for detecting the positions of the chips.

FIG. 4 is a view showing the structure of a conventional chip position detector. A film 51 has chips 52a, 52b ... placed thereon, and can be moved on a plane with being held by a table (not shown). The movement of the film 51 causes the chips 52a, 52b ... to be opposed to an industrial television camera (ITV) 55 in order. Light is radiated to the chips 52a, 52b ... on the film 51 by means of a vertical illuminator 53 and an oblique illuminator 54. The ITV 55 detects the light reflected by the chips 52a, 52b ... so as to recognize their coordinates.

In the case where the positions of the chips are detected by the above-mentioned conventional method, however, light reflection varies owing to variation in film thickness of an oxide on chip surfaces. Consequently, the positions of the chips cannot always be read precisely. In the case where the semiconductor chip is a LED element (GaP, GaAlAs or the like), particularly, a native oxide varies widely. Consequently, surface conditions are unstable so that the positions of the chips cannot always be detected precisely. This disadvantage will be described in more detail.

FIGS. 5 and 6 are plan and side views of a LED element as a semiconductor chip, respectively. The central portions of the upper faces of LED elements 52a, 52b, 52c ... are provided with electrodes 61 comprised of Al or the like. An oxide film 62 is formed as a passivation around the electrode 61. The thickness of the oxide film 62 varies. In the case where the positions of the chips are detected by the position detector shown in FIG. 4, they cannot always be detected precisely. By way of example, FIGS. 7(a) to (d) show the state of detection carried out by the ITV 55. Although the LED elements 52a, 52b, 52c ... are excellent in quality, the state of detection varies. In case of the state of detection shown in FIGS. 7(b) to (d), it is impossible to carry out position detection precisely.

SUMMARY OF THE INVENTION

It is an object of the present invention to provide a semiconductor chip position detector capable of precisely detecting the positions of semiconductor chips on a film in the case where the semiconductor chips such as LED elements which vary in surface condition are die-bonded.

The present invention provides a semiconductor chip position detector comprising a film table for carrying thereon a detection subject of a transparent film placed on semiconductor chips, a light source, optical fiber cables in which one end is connected to the light source and another end is opened at a position under the transparent film so as to radiate a light beam from the optical fiber cable on the semiconductor chips through the transparent film and position recognition means provided above the film table for recognizing positions of the semiconductor chips based on shadow shapes thereof.

BRIEF DESCRIPTION OF THE DRAWINGS

FIG. 2 is a plan view showing the state of a semiconductor chip detected by the semiconductor chip position detector;

FIG. 3 is a front view showing the schematic structure of a semiconductor chip position detector according to a second embodiment of the present invention;

DETAILED DESCRIPTION OF THE PREFERRED EMBODIMENTS

According to the semiconductor chip position detector, it is essential to use a detection subject in which semiconductor chips are devised to mount on a transparent film. The transparent film may be any polymers which do not substantially interfere with the passage of light generated from the light source, e.g., polyvinyl chloride or the like.

The thickness of the transparent film is properly determined according to the material of the film, the size or number of the chips placed on the film, and the like. Preferably, the thickness of the transparent film is about 80 to 150 μm.

According to the present detector, the light led by the optical fiber cables can be radiated upwardly from below the transparent film, thereby projecting shadow of the plane of chip on the transparent film upwardly. Consequently, the shapes of the chip plane can be recognized accurately. Further, an exposure region of the light is narrowed down so that the shape of the chip can appear more clearly compared with the case where a conventional light source as the lamp is used.

The light source may be the conventional ones such as a tungsten lamp, a halogen lamp or an LED using a direct current voltage power source.

The film table is typically a cylindrical member called sleeve, which can carry thereon the transparent film having chips.

The optical fiber cable may be quartz glass fiber, multicomponent glass fiber, plastic fiber or the like. The number of the optical fiber cables is arbitrary. Preferably, the optical fiber cables are used in sets of two in consideration of the precision of chip position detection and cost. One of the ends of the optical fiber cable is provided upwardly below the transparent film. The other end of the optical fiber cable is provided near the light source.

Preferably, the light source which is positioned above the film table is provided with two shutter means so as to radiate a light beam below and above the detection subject (chips) in switchable way. Specifically, one shutter means is interposed between the light source and the optical fiber cable and another one between the light source and the film table.

An industrial television camera, a CCD (charge coupled device) camera or the like is used for the position recognition means. The position recognition means serves to detect light radiated from the optical fiber cables. In this case, the radiated light is intercepted by the chips placed on the transparent film. Consequently, the shape of the chip plane is precisely inputted to the position recognition means.

The position recognition means may have the function of recognizing the positions of the chips based on their shadow shapes generated by the radiated light, and the function of recognizing the positions of the chips based on the light reflected by the chips which are placed on the transparent film. In this case, the light source is provided above the transparent film and serves to radiate light to the chips from above.

Figure 1:
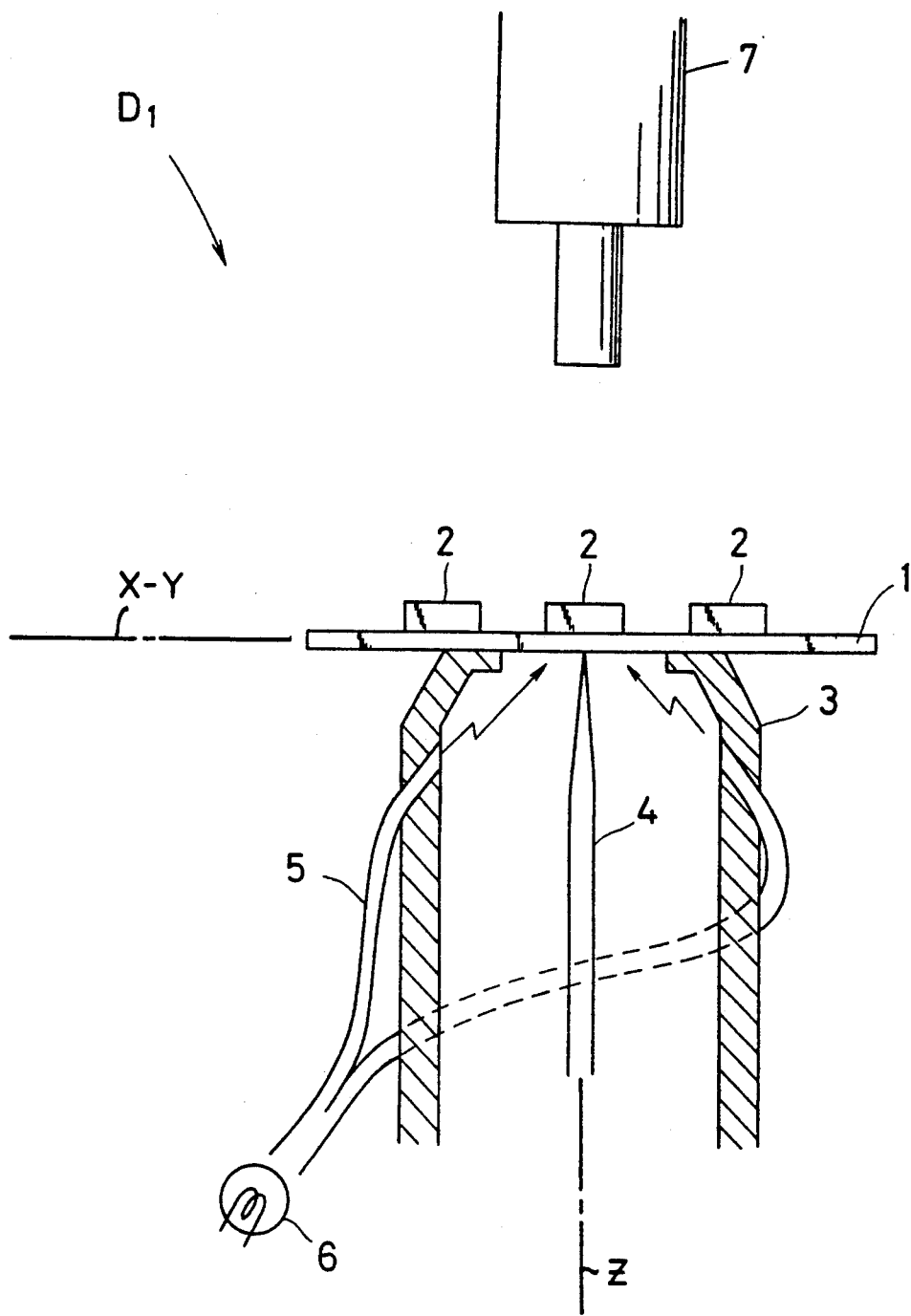
FIG. 1 is a front view showing the schematic structure of a semiconductor chip position detector according to a first embodiment of the present invention.
Figures 2, 3:
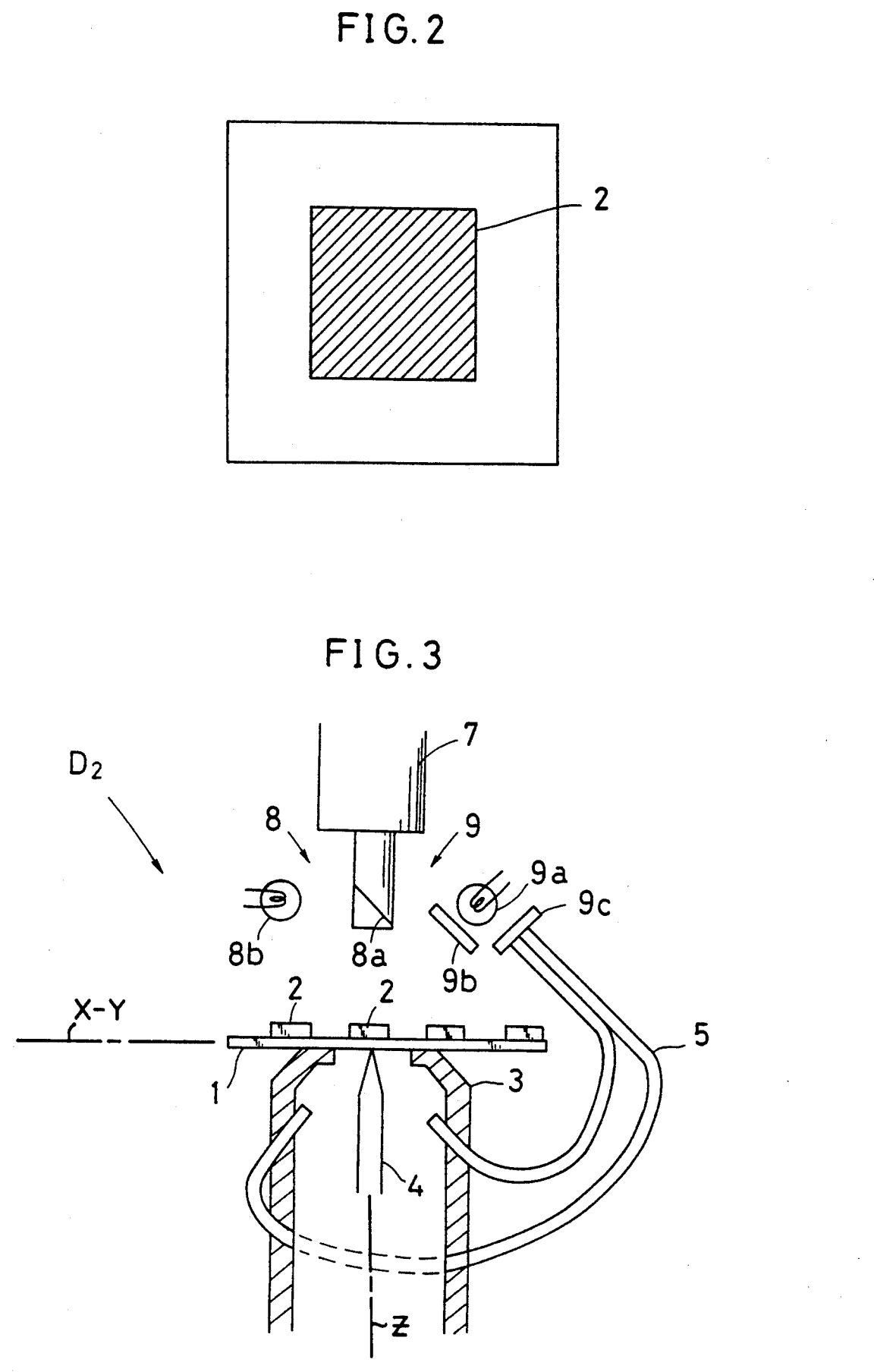
Figure 4:
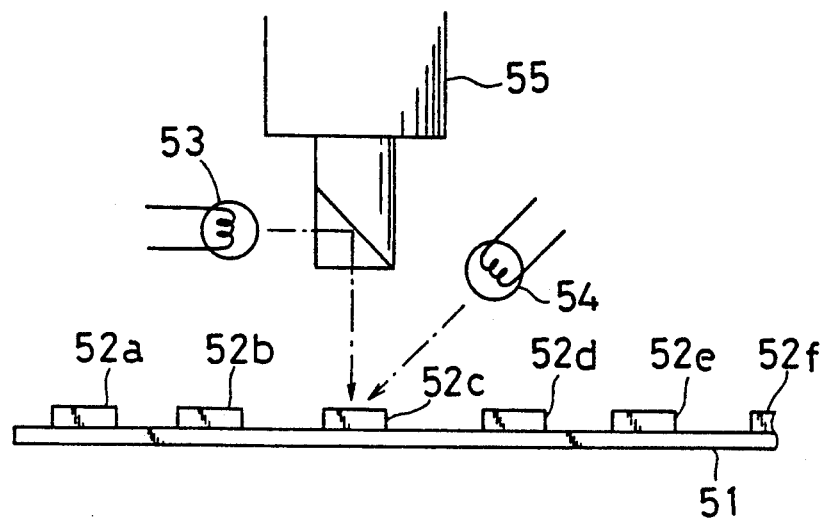
FIG. 4 is a front view showing the schematic structure of a semiconductor chip position detector provided in a die bonding device according to the prior art.
Figure 5:
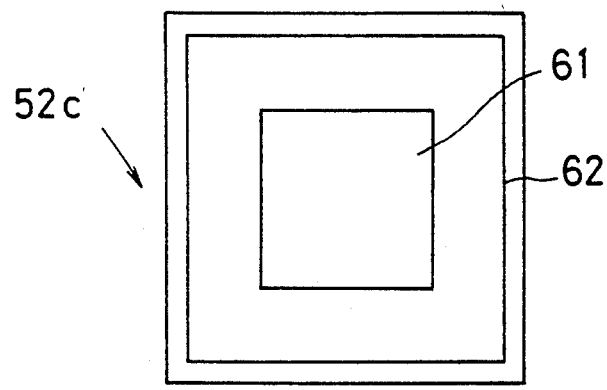
FIG. 5 is a plan view of a LED element as a chip applied to the semiconductor chip position detector according to the prior art.
Figure 6:
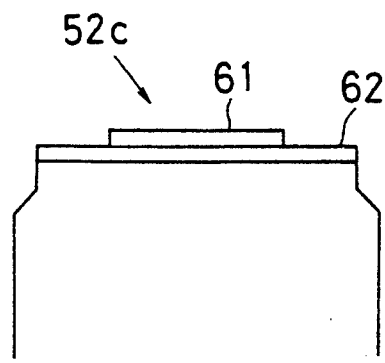
FIG. 6 is a side view of the LED element.
Figure 7A:
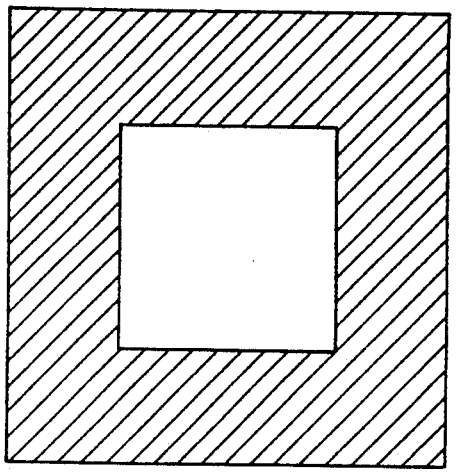
FIGS. 7(a) to (d) are plan views showing the detected surface condition of the LED element according to the prior art.
Figure 7B:
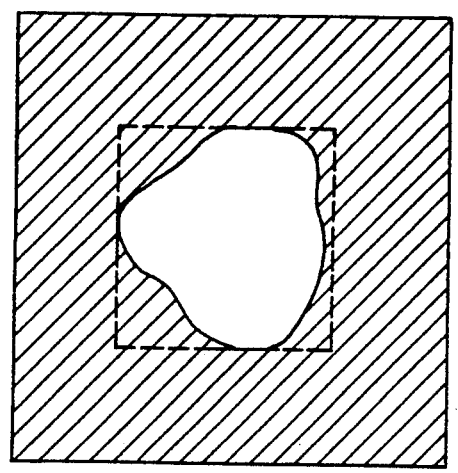
Figure 7C:
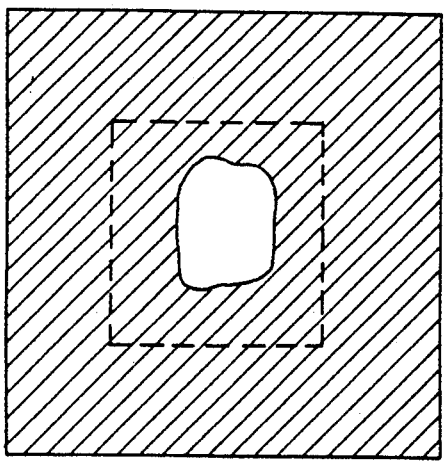
Figure 7D:
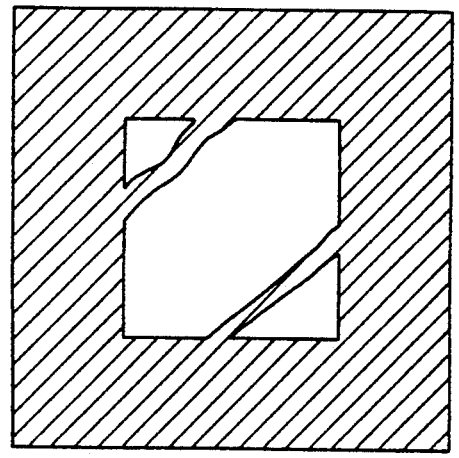

From another aspect, the present invention provides a method for detecting the positions of semiconductor chips comprising the steps of optically detecting positions of semiconductor chips placed on a transparent film in a die bonding device and picking up the semiconductor chips based on the positions thus detected, as shown in FIGS. 1 to 3. According to the method of the present invention, the transparent film is placed on a film table. One end of the optical fiber cable is provided in the vicinity of the film table so as to radiate a light beam from below the chips and the position recognition means is provided above the film so as to recognize the positions of the semiconductor chips. When light led from the optical fiber cables is radiated upwardly from below the film on which the semiconductor chips are placed, the positions of the semiconductor chips are recognized by the position recognition means based on the shadow shapes of the semiconductor chips which are generated by the radiated light.

According to the device and method of the present invention, even if the semiconductor chip is a LED element or the like in which spots are easily generated on a surface by a silicon oxide, the plane shape of the chip can be recognized by radiating the light from the backside of the chip and detecting the chip on the front side thereof. Consequently, the positions of the chips can be detected precisely. It is sufficient that the film on which the chips are placed is transparent. Since it is not required that the film is subjected to coloring and the like, costs can be reduced. At the time of chip position detection, the exposure region is narrowed down by the optical fiber cable. Consequently, it is sufficient that the exposure region has almost the same size as a chip area. Thus, the labor of the light source can be eliminated or reduced.

First Embodiment

FIG. 1 shows the schematic structure of a semiconductor chip position detector D1 according to a first embodiment of the present invention. In FIG. 1, a plurality of diced semiconductor chips (LED elements) 2 are placed on a transparent film 1. The transparent film 1 is comprised of polyvinyl chloride as a principal component and has a thickness of 100 $\mu$m. The film 1 is held by a frame (not shown) and is moved on a plane by a stepping table (not shown) in the directions of X and Y (in longitudinal and lateral directions).

The film 1 is placed on the upper end of a thrust sleeve 3 as a film table. A needle 4 and one end of each of two optical fiber cables 5 are provided in the sleeve 3. The optical fiber cable 5 is comprised of a quartz glass fiber as a principal component. In the case where the positions of the chips 2 are detected, the needle 4 pushes up the chips 2 such that they are always held at a constant height. The needle 4, which constitutes chip holding means below the film, holds the chips 2 on the film 1 at a predetermined location in a direction perpendicular to the X-Y plane (labeled X-Y in FIG. 1). The needle 4 has an axis Z which is perpendicular to the X-Y plane. Light is led from a light source 6 to the optical fiber cable 5. The light from the light source 6 is converged in the vicinity of the tip portion of the needle 4. As also seen in FIG. 1, the light is incident on the bottom side of the film and converges proximate the predetermined location (e.g., the tip of the needle 4) from two distinct points. The sleeve 3 is provided on the bottom side of the film and is spaced apart from the needle 4. The optical fiber cable 5 has one end connected to the light source 6 with opposite ends of fibers in the cable mounted on the sleeve 3 so as to direct a light beam toward the vicinity of the tip of the needle 4.

An industrial television camera (ITV) 7 is provided above the film 1 so as to be opposed to the needle 4. The ITV 7 detects the light from the optical fiber cable 5. At the time of detection, the light is intercepted by the chips 2 placed on the film 1. Consequently, the plane shapes of the chips 2 can precisely be inputted to the ITV 7.

FIG. 2 shows the state detected by the ITV 7. As shown in FIG. 2, the plane shape of the chip 2 appears as a shadow on the ITV 7. In this case, even if a silicon oxide surface varies in film thickness or has a flaw, the shape of the chip can precisely be recognized. Consequently, the position of the chip can be detected precisely.

As a result, the positioning precision of the chip 2 is greatly enhanced. Conventionally, the positioning precision is $\pm 50$ $\mu$m. According to the present embodiment, the positioning precision is $\pm 10$ $\mu$m. Referring to a conventional method, in the case where the normal state of reflection is not obtained, the chips are not recognized and are left on the film. According to the detector D1, however, the above-mentioned drawback is eliminated. Furthermore, the plane shape of the chip 2 can be recognized precisely. Consequently, shape defects such as breakage can also be detected. If the breakage is generated on 80% of a chip plane or more, it is judged that the plane shape is defective.

Second Embodiment

FIG. 3 shows the schematic structure of a semiconductor chip position detector D2 according to a second embodiment of the present invention. In FIG. 3, the same parts have the same reference numerals as in the first embodiment.

First, there will be described the same parts as in the first embodiment. Chips 2 are placed on a transparent film 1 and are movably supported in the directions of X and Y. A sleeve 3, a needle 4 and one end of each of two optical fiber cables 5 are provided below the film 1. An ITV 7 is provided opposite to the needle 4 above the film 1.

The detector D2 is provided with a vertical illuminator 8 and an oblique illuminator 9. The vertical illuminator 8 includes a reflecting mirror 8a on the tip portion of the ITV 7. A light source 8b is provided beside the reflecting mirror 8a.

When the light source 8b lights up, the chips 2 on the film 1 are exposed by light which is reflected by the reflecting mirror 8a. The oblique illuminator 9 has a light source 9a provided obliquely above the film 1. The other end of each of the optical fiber cables 5 is drawn into the position of the light source 9a. More specifically, the light source 9a serves to expose the surfaces of the chips 2 obliquely from above and to expose the chips 2 from below.

Referring to the device D2, there are separately set the timings of exposing the chips 2 from above and below. Consequently, the light source 9a has shutters 9b and 9c. The shutter 9b serves to intercept light which directly exposes the chips 2. When the shutter 9b is closed, the chips 2 are exposed through the optical fiber cables 5 from below. The shutter 9c serves to intercept light to the optical fiber cable 5 side. When the shutter 9c is closed, the chips 2 are exposed obliquely from above.

At the time of die bonding, the shutter 9b is first opened and the shutter 9c is closed to expose the chips 2 obliquely from above and vertically from above by means of the vertical illuminator 8. Then, the surface conditions of the chips 2 are detected by the ITV 7 so as to decide the quality of the chips 2. Thereafter, defective chips 2 are removed. The positions of good chips 2 are detected for pick-up.

As described above, the shutter 9b is closed and the shutter 9c is opened when positioning the good chips 2. Consequently, the light is led to the chips 2 through the film 1 by the optical fiber cables 5, so that the plane shadows of the chips 2 appear. The shadow shapes cause chip positions to be detected precisely. The chips 2 are picked up and are subjected to die bonding.

Preferably, a light source having no flicker such as a tungsten lamp, a halogen lamp or a LED using a direct current voltage power source is utilized for the light sources 8 and 9 for exposing the chips 2.

What is claimed is:

1. A semiconductor chip position detector comprising:
   means for carrying a transparent film upon which semiconductor chips are placed;
   a light source;
   an optical fiber cable having one end connected to the light source and another end opened at a position on a second side of the transparent film so as to radiate a light beam from the optical fiber cable on the semiconductor chips through the transparent film; and
   position recognition means provided on a first side of the transparent film for recognizing positions of the semiconductor chips based on shadow shapes thereof;
   wherein the light source is positioned above the film carrying means and provided with two shutter means, one of which is interposed between the light source and the optical fiber cable and another one of which is interposed between the light source and the film carrying means, thereby radiating a light beam above and below the semiconductor chip in selective fashion.

2. The semiconductor chip position detector according to claim 1, wherein the position recognition means recognizes positions of the semiconductor chips based on the light which is reflected by them, when the shutter means between the light source and the film carrying means is opened while the other shutter is closed.

3. The semiconductor chip position detector according to claim 1, wherein the position recognition means comprises an industrial television camera.

4. A semiconductor chip position detector comprising:
   means for carrying a transparent film in a plane, the transparent film having semiconductor chips placed on a first side thereof;
   chip holding means provided on a second side of the film for holding chips on the film at a predetermined location in a direction perpendicular to the plane;
   a light source;
   means for directing light emitted from the light source whereby the light is incident on the second side of the film and converges proximate the predetermined location from two distinct points; and
   position recognition means provided on the first side of the transparent film for recognizing positions of the semiconductor chips based on shadow shapes thereof;
   wherein the light source is provided with two shutter means, one of which is interposed between the light source and the light directing means and another one of which is interposed between the light source and the film carrying means, thereby radiating a light beam above and below the semiconductor chip in selective fashion.

5. The semiconductor chip position detector according to claim 4, wherein the light source is situated on the first side of the film.

6. The semiconductor chip position detector according to claim 4, wherein the position recognition means recognizes positions of the semiconductor chips based on the light which is reflected by them, when the shutter means between the light source and the film carrying means is opened while the other shutter is closed.

7. The semiconductor chip position detector according to claim 4, wherein the light directing means comprises an optical fiber cable having one end connected to the light source and another end opened at a point on the second side of the transparent film so as to radiate a light beam from the optical fiber cable on the semiconductor chips through the transparent film.

8. The semiconductor chip position detector according to claim 4, wherein the chip holding means has a tip which contacts the second side of the film, and wherein the light from the light directing means converges in the vicinity of the tip.

9. The semiconductor chip position detector according to claim 8, wherein the chip holding means comprises a needle having an axis perpendicular to the plane, wherein a sleeve member is provided on the second side of the film and spaced apart from the needle, and wherein the light directing means comprises an optical fiber cable having one end connected to the light source and another end mounted on the sleeve member so as to direct a light beam toward the vicinity of the tip.

10. The semiconductor chip position detector according to claim 4, wherein the position recognition means comprises an industrial television camera.

* * * * *